United States Patent [19]

Hayes

[11] 4,310,920

[45] Jan. 12, 1982

[54] SINGLE SIDEBAND AM-FM STEREO MODULATION SYSTEM

[76] Inventor: William A. Hayes, 12 Schiller St., Hicksville, N.Y. 11801

[21] Appl. No.: 117,505

[22] Filed: Feb. 1, 1980

Related U.S. Application Data

[63] Continuation-in-part of Ser. No. 756,811, Jan. 5, 1977, abandoned.

[51] Int. Cl.$^3$ .......................... H04J 1/02; H04H 5/00

[52] U.S. Cl. .................................. 370/11; 179/1 GB; 179/1 GS; 370/69; 455/46; 455/47; 455/103; 455/109

[58] Field of Search ..................... 455/59, 61, 109, 46, 455/47, 103, 104, 105, 202, 203; 179/1 GB, 1 GS, 1 G, 1 GC; 370/69, 11, 12

[56] References Cited

U.S. PATENT DOCUMENTS 2,835,889 5/1958 Dyer et al. ............................ 455/47

2,917,623 12/1959 Crosby ............................ 179/1 GC

*Primary Examiner*—Marc E. Bookbinder

*Attorney, Agent, or Firm*—James P. Malone

[57] ABSTRACT

Single sideband modulation system. A first single sideband of radio frequency is generated with first audio modulation on the lower side of an assigned frequency, the first single sideband bandwidth being equal to the highest frequency of said first audio modulation. A second single sideband of radio frequency is generated with second audio modulation on the upper side of the assigned frequency, the second single sideband bandwidth being equal to the highest frequency of said second audio modulation. A first stereo channel is modulated on the lower sideband frequency. A second stereo channel is modulated on the upper sideband frequency. The stereo channels are combined whereby a receiver tuned to the assigned non-transmitted carrier frequency will receive both stereo channels.

1 Claim, 7 Drawing Figures

SINGLE SIDEBAND AM-FM STEREO MODULATION SYSTEM

This application is a continuation-in-part of my application Ser. No. 756,811, filed Jan. 5, 1977, of the same title, now abandoned.

This invention relates to single sideband AM-FM modulation system and more particularly to a stereo system therefor.

TECHNICAL FIELD

This application is an improvement of my prior U.S. Pat. No. 3,714,577, granted on Jan. 30, 1973, which relates to a single sideband AM-FM modulation system.

Due to the many growing uses of radio communication channels, there is a shortage of channels. In order to provide more channels, it is necessary to make use of narrower bandwidths without sacrificing quality of transmission.

BACKGROUND ART

The present invention provides a stereo modulation system using a very narrow bandwidth which occupies a very small portion of the radio frequency spectrum.

More particularly, the present invention provides a good quality single sideband stereo modulation system in which the modulation is performed at low power levels. The signal is then amplified and a single sideband for each channel is passed through a high Q bandpass filter and then transmitted.

The transmitted signals may be received and detected by conventional radio type detectors tuned to the center frequency of the single transmitted sidebands.

A brief history of Radio Broadcasting shows that we have two systems for public broadcasting of music and voice. These are AM and FM. We also have a single sideband suppressed carrier but it is unsuitable for music.

Applicant is proposing a new method for stereo broadcasting using a compatible single sideband suppressed carrier system having broadcast quality. This is called Frequency Aperture Modulation or, FAM.

The existing sideband now in use obtains its signal by phase cancelling of the carrier which must be reinjected at the receiver end. The phase of this reinjected carrier must be exactly that of the transmitted signal and must be highly stable for good voice intelligence. With Frequency Aperture Modulation, reception at the receiver does not require reinjection as the carrier is keyed by the audio, all harmonics included. In the existing single sideband suppressed carrier, all the harmonics are cancelled out, making it unsuitable for quality music broadcasting.

Applicant proposes that two of these FAM signals be placed back to back, one for each stereo channel. Each channel is 9 Khz wide, requiring a total bandwidth of approximately 18 Khz of the broadcast spectrum. The receiver would have two separate IF and audio channels for stereo reception.

To generate a FAM signal for one channel we first amplitude modulate an inaudible sub-carrier of 50 Khz with audio that ranges from 50 Hz to 9000 Hz. This signal then passes into a phase modulated amplifier and combines with a higher frequency of 500 Khz derived from a crystal oscillator. The result is a carrier and two sidebands, 500, 450 and 550 Khz. The lower side frequency (450 Khz) is then passed through a filter and the carrier and upper side frequency are eliminated. The 450 Khz signal is then multiplied to a much higher frequency. This procedure gives the greater frequency deviation that is required. We now have a very high frequency signal that is frequency modulated with 50 Khz and audio. This signal can now be hetrodyned with another carrier, the difference being a frequency that falls into the AM broadcast band. The resultant signal is then amplified and passed into a filter that is 9 Khz wide. The filter being only 9 Khz wide, filters out the 50 Khz sub-carrier and only permits RF components with the audio to pass. With no audio modulating the 50 Khz there is no energy getting through, therefore no carrier. Please note, that the hetrodyning signal places one side of the side frequency of the sub-carrier so that it falls in the 9 Khz filter. The 50 Khz is also frequency modulated and the center 31 should not fall into the filter, as some distortion will result. This is the same as tuning an AM receiver to an FM signal. Note, also the 9 Khz filter determines the frequency transmitted. The other channel is similarly generated.

The advantages of transmitting a FAM signal are the same as those of our present single sideband suppressed carrier. Many commercial communication companies and radio amateurs are using single sideband suppressed carrier. The efficiency is very high and energy is saved as the amount of electric power required is far less. The space required in the radio spectrum is one half that of AM and FM systems. Due to the filtering the chances of spurious radiation are reduced and interference of stations is at a minimum as the carrier is not transmitted. Distortion that occurs in AM and FM due to phase cancellation of signal caused by two different transmission paths is mostly eliminated. This will enhance overseas transmissions.

Two stations on the same frequency will not hetrodyne and will make tuning out one or the other easier.

Reception of a Frequency Aperture Modulated signal is compatible and can be received on conventional AM receivers now in use. If one wants stereo immediately, two separate receivers can be tuned, one to the upper and one to the lower frequencies. One receiver will act as channel one and the other as channel two. Most of the circuitry used in conventional receivers is applicable and greater improvement is possible with a new design having two IF strips and two audio strips, one for each channel. Due to the narrow bandwidth the reception noise figures is improved. Overseas broadcasting of stereo is improved. Overseas broadcasting of stereo on the higher frequencies is possible. Another advantage is that with no carrier transmitted there is a great reduction of 'birdies' caused by hetrodyning within the receiver itself.

The fidelity of Frequency Aperture Modulation is excellent as all the audio harmonics are transmitted. This feature is not possible with the present sideband systems. Using FAM for stereo, the two channels together will make it possible to hear the high frequencies as the ear combines the output of the two loudspeakers. On the air tests will show to what extent this effect obtains.

DISCLOSURE OF THE INVENTION

Accordingly, a principal object of the invention is to obtain new and improved stereo modulation system.

Another object of the invention is to provide new and improved stereo modulation system transmitting only single sidebands which require a very small bandwidth in the radio frequency spectrum.

Another object of the invention is to provide new and improved means for generating a radio frequency on the lower side of an assigned frequency, means for generating a radio frequency on the upper side of the assigned frequency, means for modulating a first stereo channel on the lower side frequency, means for modulating a second stereo channel on the upper side frequency, whereby a receiver tuned to the assigned frequency will receive both stereo channels.

Another object of the invention is to develop a stereophonic broadcast system being capable of operating on a very narrow band and not create interference to other stations. The separation from other stations should be minimal and be compatible to all radio receivers now in use for AM reception.

The prior art systems are FM systems that are wideband and the receivers are for this type of reception. These systems are not compatible with the present AM receivers.

BRIEF DESCRIPTION OF THE DRAWINGS

These and other objects of the invention will be apparent from the following specification and drawings of which:

Referring to FIG. 1, the existing sideband systems now in use obtains its signal by phase cancelling of the carrier which must be reinjected at the receiver end. The phase of this reinjected carrier must be exactly that of the transmitted signal and must be highly stable for good voice intelligence. With the present Frequency Aperture Modulation, reception at the receiver does not require reinjection as the carrier is keyed by the audio, all harmonics included. In the prior and existing single sideband suppressed carrier, all the harmonics are cancelled out, making it unsuitable for quality music broadcasting.

Figure 1:
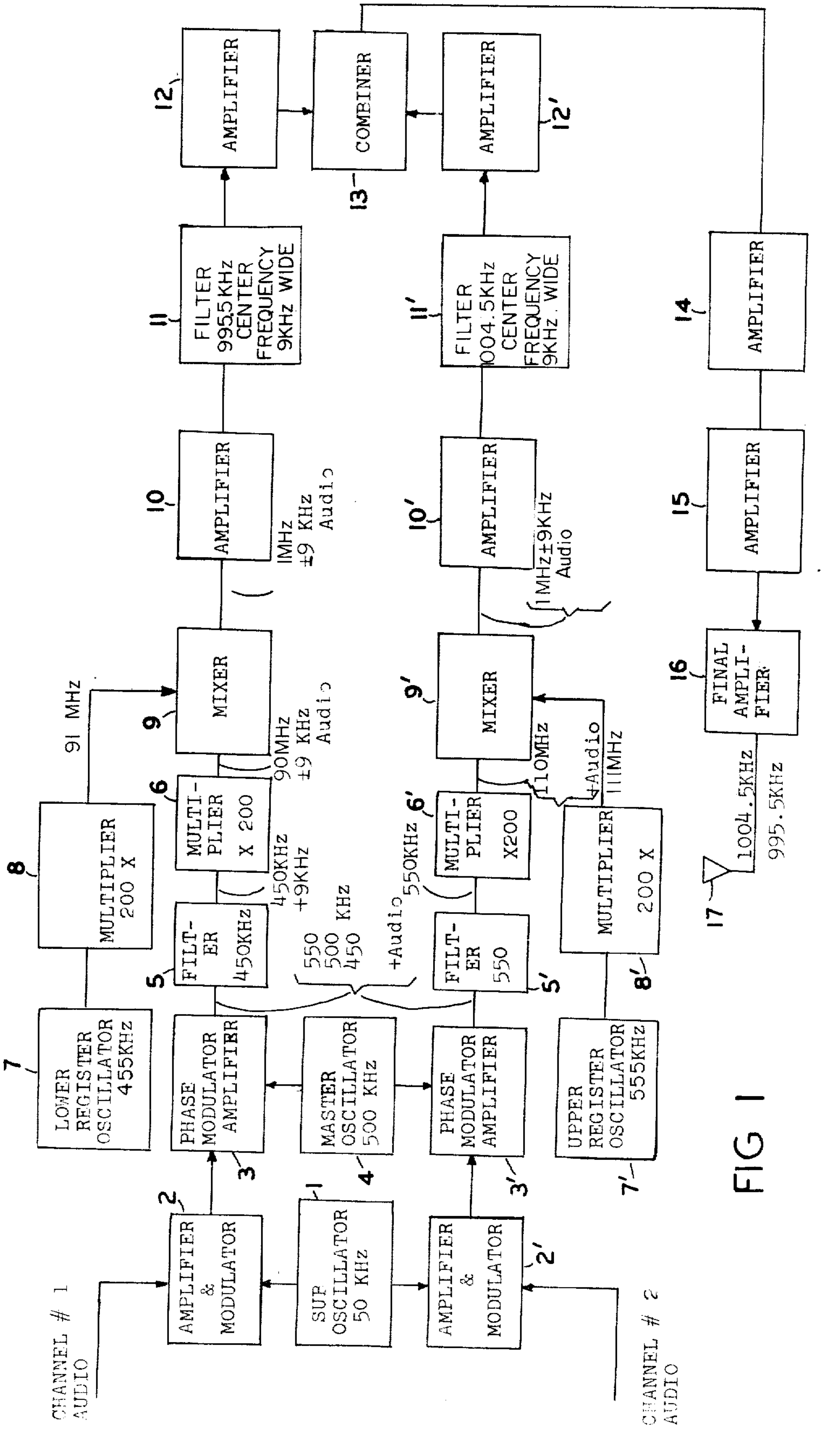
FIG. 1 shows a block diagram of the embodiment of a transmitter according to the invention.

In this system, two of these FAM signals are placed back to back, one for each stereo channel. Each channel is 9 Khz wide, requiring a total bandwidth of approximately 18 Khz of the broadcast spectrum. The receiver would have two separate IF and audio channels for stereo reception.

The master oscillator 4, supplies a signal to be modulated in modulators 3 and 3'. These modulators produce a carrier and sidebands. In each case the carrier and one sideband are discarded. The filters 5 and 5' select frequencies as shown. After the filters, the spectrum are multiplied up and mixed with signals that produce signals in the broadcast band. The filters 11, 11' pass very narrow signals one above and one below an assigned frequency. These filters determine the transmitted signal frequency. The 50 Khz sub-carrier is not permitted to pass and RF components at the filter frequencies get through. In that the filters are only 9 Khz wide RF components and audio frequencies pass.

The filters 5, 5' are 50 Khz wide permitting the passage of the audio and the 50 Khz signal. Both are phase and amplitude modulated, and when multiplied produce a spectrum that is wide but the narrow filters 11, and 11' select the upper and lower signals to be transmitted. The envelope transmitted does not require reinjection of a carrier at the receiver as most single sideband does. With no audio modulation there is no energy transmitted.

To generate A FAM signal for one channel we first amplitude modulate with modulator 2, an inaudible sub-carrier of 50 Khz from oscillator 1, with audio that ranges from 50 Hz to 9000 Hz. This signal then passes into a phase modulated amplifier 3, and combines with a higher frequency of 500 Khz derived from a crystal oscillator 4. The result is a carrier and two sidebands, 500, 450 and 550 Khz. The lower side frequency (450 Khz) is then passed through a filter 5, and the carrier and upper side frequency are eliminated. The 450 Khz signal is then multiplied by 200 to a much higher frequency by multiplier 6. This procedure gives the greater frequency deviation that is required. We now have a very high frequency signal 9000 Khz that is phase modulated with audio.

Figure 3:
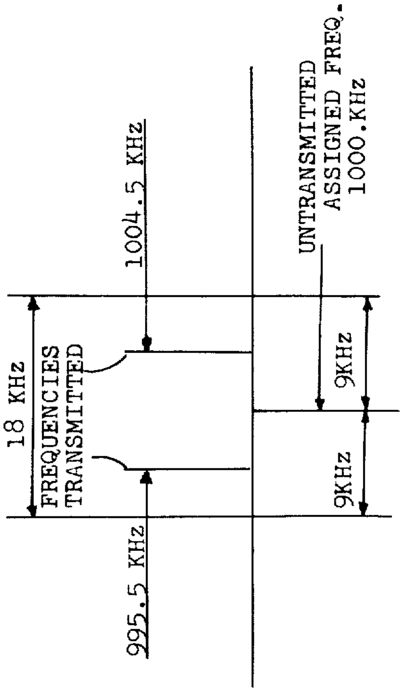
FIG. 3 is a diagram illustrative of the operation of the invention.

This signal can now be hetrodyned in mixer 9, with another carrier from oscillator 7 and multiplier 8, the difference 1000 Khz being a frequency that falls into the AM broadcast band. The resultant signal is then amplified in amplifier 10 and passed into a filter 11, that is 9 Khz wide. The filter 11, being only 9 Khz wide, filters out the 50 Khz sub-carrier and only permits 1004.5 Khz RF components plus the audio to pass. With no audio modulating the 50 Khz there is no energy getting through, therefore no carrier. Please note that the hetrodyining signal places one side of the side frequency of the sub-carrier so that it falls in the 9 Khz filter as shown in FIG. 3. The 50 Khz is also frequency modulated and the center 31 should not fall into the filter as some distortion will result. This is the same as tuning an AM receiver to an FM signal. Note, also the 9 Khz wide filter 11, determines the frequency transmitted. Typical frequencies are shown on FIG. 1.

The other signal is generated in the system shown in the lower part of FIG. 1 in the same manner as described above. The components in the lower part of FIG. 1 are primed numbers but their operation is the same as described above with the unprimed numbers.

The signals from the two channels are then amplified in amplifier 12 and 12' combined with combiner means 13, amplified in amplifiers 14, 15 and 16 and transmitted on antenna 17. In the example of FIG. 1, the transmitted frequencies are 1004.5 and 995.5 Khz.

The sideband signal at the output of filter 5 has audio modulation impressed on it. Phase modulation is generated by the phase modulator 3. This phase shifted sideband signal can be multiplied higher in frequency and its shift increased. The deviation and linearity can be adjusted to the proper amount changing the audio and sub-carrier levels for necessary processing. If any frequency in excess of 1004.5 KHz±4.5 KHz is theoretically present it is rejected by filter 11, and not utilized. The AM deviation is not multiplied two hundred times.

Considering only one channel at 450 KHz with no audio, then a beat between the sub-carrier and the audio does not take place. As soon as audio is added in the phase modulator a beat between it and the sub-carrier occurs. This beat makes the sideband system compatible with AM. This is why the sub-carrier is mentioned after filter 5.

The prior art systems show two FM generating means. These two FM signals are combined and transmitted on their respective frequencies and still remain as frequency modulated signals.

In this system, applicant proposes only one sideband of a phase modulated or PM signal is permitted to pass through the filter 11, therefore it can only be called a single sideband system. There is no carrier as only one sideband is allowed to pass through filter 11, as was previously mentioned.

The advantages of transmitting a FAM signal are the same as those of our present single sideband suppressed carrier. Many commercial communication companies and radio amateurs are using single sideband suppressed carriers. The efficiency is very high and energy is saved as the amount of electric power required is far less. The space required in radio spectrum is one half that of AM and FM systems. Due to the filtering the chances of spurious radiation are reduced and interference of stations is at a minimum as the carrier is not transmitted. Distortion that occurs in AM and FM due to phase cancellation of signal caused by two different transmission paths is mostly eliminated. This will enhance overseas transmissions.

Figure 2:
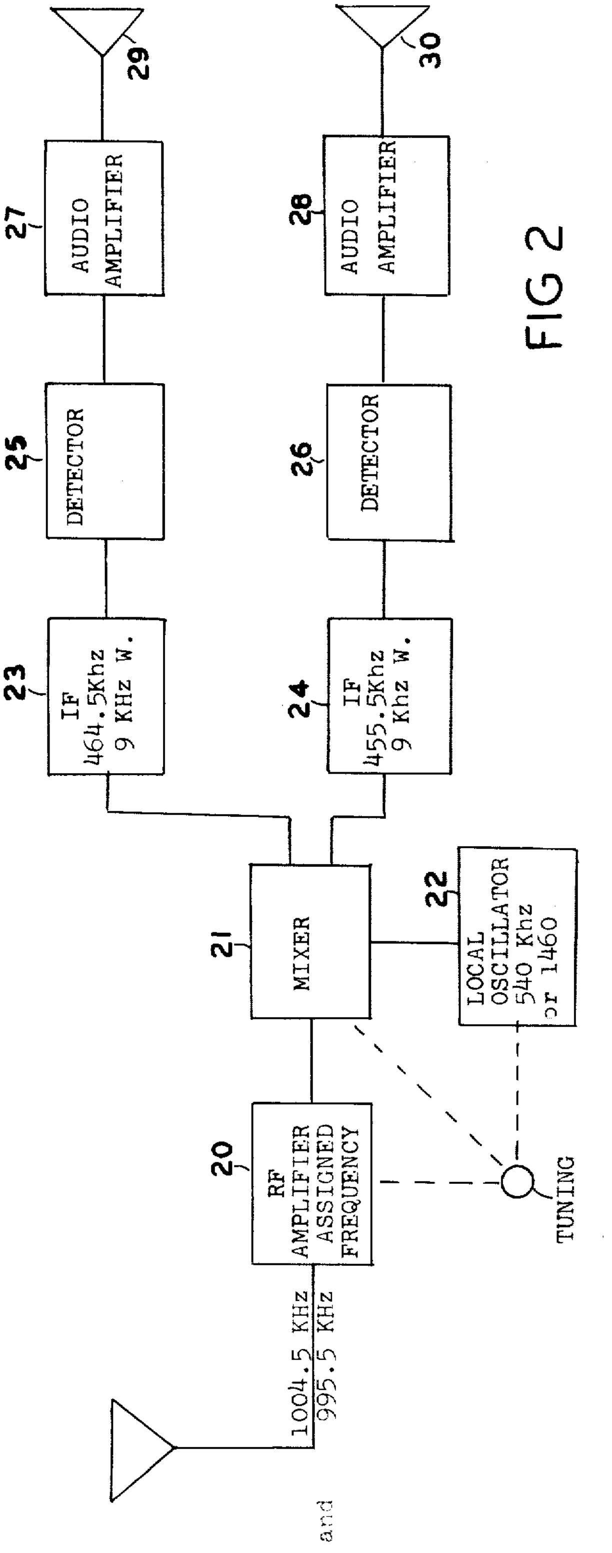
FIG. 2 is a block diagram of the receiver according to the invention.

FIG. 2 shows a typical dual channel receiver for reception of stereo signals on the AM broadcast band. The front end is similar to all subperhytrodyne receivers having an RF stage 20, followed by a mixer 21, and local oscillator 22. Two outputs are taken from the mixer on different frequencies one below and one above a mean frequency. I F amplifiers 23, 24 for each of these frequencies provide the required amplification for detection by detectors 25, 26 of the signals for the audio amplifiers 27, 28. AGC for the receiver can be derived from the modulation envelope directly as a continuous carrier is not transmitted. The AGC in present SSB systems can be used having fast attack and slow-decay time constant. This will prevent the thump and pumping usually experienced when receiving an SSB signal with no AGC means. AGC can also be obtained from the audio.

Reception of signals above 10 Khz is possible and may be detected and injected into the audio although the ear may detect these high frequencies through the two speakers, 29 and 30.

To enhance the reception of the receivers now in use it may be necessary to use a sub-audible signal to keep the receiving level somewhat constant and in stereo receivers be means for identifying stereo transmissions. This signal would be injected at the transmitter to fill long pauses in programs and would be a temporary measure until the present receivers are antiquated.

On the air tests will determine the requirement of the above and any other audio processing such as compression, squelch, pre-emphasis, de-emphasis, etc.

The basic modulation system is substantially the same as shown in applicant's prior U.S. Pat. No. 3,714,577. The present invention is a stereo system embodying these principles.

To fully understand the present system, which is compatible with AM and can be received on an AM receiver, one has to understand how the modulation process takes place. When one modulates a radio wave, two sidebands are generated. The radio wave is split in two, and an upper and lower sidebands are created, these two sidebands are transmitted over the air and are received by the receiver. A FM receiver has a discriminator detector that compares these upper and lower sidebands producing a voltage that is amplified and drives a speaker. Now these two sidebands are separated by a time difference equal to the period of the modulating frequency. We can say that each sideband is in a different time zone.

It is known that each sideband has the same information and can be transmitted by itself and received on a single sideband receiver. This system is well known and has been used for years.

Great attention is made in the prior art to completely eliminate the one sideband not used and complete elimination means that the other half of this comparing signal is no longer available at the receiver. Elimination of the signal in the other time zone has to be replaced at the receiver and is done so by injecting a signal from a local oscillator. This local oscillator signal has to be exactly in step with the transmitted signal at the transmitter and if it is out of step, distortion will result. Remember that each sideband is in a different time zone and with conventional single sideband one is eliminated or that one of the two timing signals is eliminated and this makes the system incompatible, with an AM receiver. All the sideband systems of the prior art are therefore incompatible as they require a local oscillator in their receivers.

To make a compatible system to be received by an AM receiver, one has to send out a single sideband signal that contains its own timing. By using a subcarrier so that the audio can modulate it, at least two major sideband signals 450 Khz and 550 Khz are created and be separated and detected.

Figure 4:
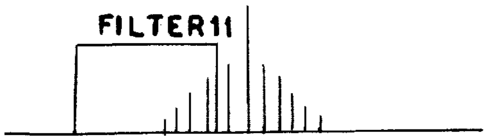
FIGS. 4, 5 and 6 are spectrum diagrams illustrative of the invention.

First, lets look at the conventional transmitted signal with a single sideband signal, the spectrum looks as in FIG. 4.

Figure 5:
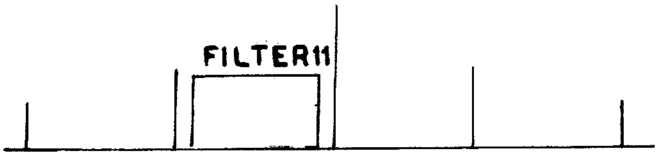

Now the same with only the subcarrier modulating the carrier, as shown in FIG. 5.

Note that the subcarrier does not fall in the filter.

Figure 6:
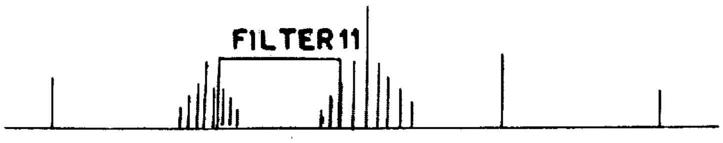

No signal gets into the filter at its subcarrier frequency is higher than the filter width. Now if we audio modulate in addition to the subcarrier we get the spectrum as shown in FIG. 6.

The audio beats with the subcarrier and produces harmonics that fall into the filter. Bear in mind that the lines shown are just to illustrate. The beats of the audio and the subcarrier in the transmitter create a difference and can be detected by a receiver. This beat is the invention that makes the system work.

Referring to the phase modulators, each phase modulator is supplied a carrier of 500 KHz and an AM modulated subcarrier. The master oscillator is not modulated. Each phase modulator is separate and is supplied from the master oscillator. Each phase modulator is a phase modulated amplifier as shown in FIG. 7.

Figure 7:
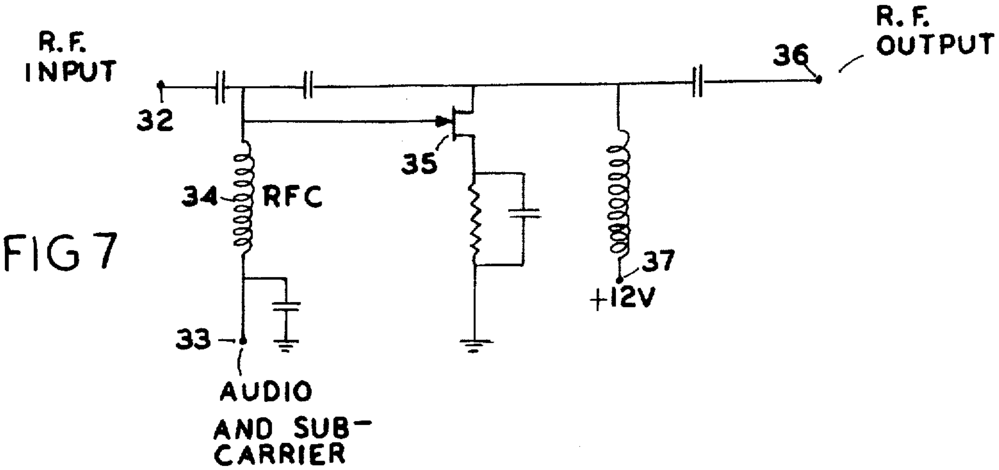
FIG. 7 is a schematic circuit diagram of each phase modulator.

FIG. 7 is a schematic diagram of a phase modulator. The radio frequency is connected on terminal 32. The audio input is connected to terminal 33 and is connected through radio frequency coil 34 to the transistor 35. The output of the transistor is connected to the radio frequency output terminal 36. A 12 volt source is connected through terminal 37 to the transistor 35.

In that phase modulation is used a large amount of multiplication of the frequency is required. By choosing a multiplication factor of 200 there was enough latitude of adjustment and also placed the output frequency in the FM band so adjustment could be made with equipment on hand.

A large multiplication was used so that the signal could be monitered with a FM broadcast receiver on hand. When the signal was down-converted to the AM broadcast band and centered to pass through the narrow bandpass filter 11, even though the multiplication was more than necessary, the FM signal was detected. Both sidebands of the FM modulation could be detected when the oscillator frequency was changed. When the exact center of the FM signal was injected in the middle of the filter 11, a very large amount of distortion was observed. When the frequency of the crystal was adjusted so good slope detection at the AM receiver was possible the quality of modulation was very good and was of good broadcast quality.

The system herein is a dual single sideband system where the signals transmitted are extracted from one sideband of each channel. The prior art systems are dual double sideband system where both sidebands in each channel are transmitted. The system is an improvement based on making a stereo system, of applicant's in U.S. Pat. No. 3,714,577.

The filter 5 is wideband peaking the output of the phase modulator and the spectrum is multiplied up to the mixer.

In phase modulation there is very little frequency modulation and a large amount of multiplication to get good linearity of the deviation is required. A deviation of more than 9 Khz is required to pass a signal at that frequency, i.e. the width of the filter 11.

In the present FAM system, the single sideband RF is controlled by the audio modulated RF sweeping across a filter. In the absence of audio, RF energy does not get through the filter 11.

The radio frequency is generated by the combining of a signal from the master oscillator and that of the audio modulated sub-carrier. Each phase modulator produces two sidebands of which only one is used and passes through filter 5. The sideband produced is then multiplied up so a greater deviation is possible.

A signal is generated the same way for the other channel. By obtaining the signal this way the master oscillator can be used for other purposes. Each channel can have its own oscillator if that is desired.

Each generating means can generate a single sideband signal to be transmitted after each filter, 11, 11'. A sideband is made in each channel by conversion in the phase modulators 3, 3'. Each phase modulator converts the RF signal into sidebands of which only one is used. Each channel can have its own oscillator if desired. The master oscillator only supplies a signal to each modulator. The phase modulated amplifier can produce sidebands and frequency shift. The audio modulated sub-carrier and RF are the output of the generating means and does generate a upper and lower single sidebands containing the audio and sub-carrier. One channel converts the upper signal and the other channel the lower signal. The master oscillator does supply a signal to each phase modulator, but each channel can have its own master oscillator and be completely separate before combining at 13 if a separate oscillator is desired. In both channels the signal before the filters 11, 11' are wide. Both sidebands are generated separately by the filters 11, 11'. Each modulator converts a signal to a sideband signal for each channel.

The applicant's system only requires a bandwidth equal to the audio modulation. This means that the space in the radio spectrum required by applicant's system is only as wide as the highest frequency signal transmitted. If a 5,000 Hz signal is transmitted the bandwidth required is only 5,000 Hz. Standard AM and FM both require twice the bandwidth.

It is claimed:

1. Means for generating a first single sideband of radio frequency with first audio modulation signal on the lower side of an assigned frequency, the first single sideband bandwidth being equal to the highest frequency of said first audio modulation signal, means for generating a second single sideband of radio frequency with second audio modulation signal on the upper side of the assigned frequency, the second single sideband bandwidth being equal to the highest frequency of said second audio modulation signal, said pair of generating means being operative for suppressing the assigned frequency signal so that it is not transmitted, means connected to the generating means to combine the first and second single sideband signals, whereby a receiver tuned to the assigned non-transmitted carrier frequency will receive both audio modulation signals, wherein the means for generating a lower radio frequency and an upper radio frequency comprises:

a master oscillator generating a master frequency, sub-carrier oscillator means, first channel amplitude modulator means connected to the sub-carrier oscillator means, first channel phase modulator means connected to the amplitude modulator means and to the master oscillator, first channel bandpass filter means connected to the phase modulator means to pass a pre-determined spectrum of frequencies, first channel first multiplying means connected to said filter means, lower register oscillator means, first channel second multiplier means connected to the lower register oscillator, first channel mixing means connected to the first and second multipliers, first channel first amplifier means connected to the output of said mixer, first channel narrow band filter means connected to said first amplifier means, the filter passing a portion of the spectrum of frequencies containing the audio modulation, first channel second amplifier means connected to the filter, second channel amplitude modulator means connected to the sub-carrier oscillator means, second channel phase modulator means connected to the amplitude modulator means and to the master oscillator, second channel bandpass filter means connected to the second channel phase modulator means to pass a pre-determined spectrum of frequencies, second channel first multiplying means connected to said second channel filter means, upper register oscillator means, second channel second multiplier means connected to the to the upper register oscillator, second channel mixing means connected to the first and second channel multipliers, second channel first amplifier means connected to the output of said second channel mixing means, second channel narrow band filter means connected to said second channel first amplifier means, the filter passing a portion of the spectrum of frequencies containing the audio modulation, second channel second amplifier means connected to the second channel narrow band filter, and said combining means connected to the first channel second amplifier means and the second channel second amplifier means.

* * * * *